United States Patent
Semwal (10) Patent No.: US 10,476,786 B2
(45) Date of Patent: Nov. 12, 2019

(54) METHOD AND SYSTEM USING A SCALABLE LABEL SCHEME FOR ALIASING IN A MULTIHOMED ETHERNET VIRTUAL PRIVATE NETWORK (EVPN) NETWORK

(71) Applicant: Arista Networks, Inc., Santa Clara, CA (US)

(72) Inventor: Rajesh Kumar Semwal, Sunnyvale, CA (US)

(73) Assignee: Arista Networks, Inc., Santa Clara, CA (US)

( * ) Notice: Subject to any disclaimer, the term of this patent is extended or adjusted under 35 U.S.C. 154(b) by 27 days.

(21) Appl. No.: 15/810,406

(22) Filed: Nov. 13, 2017

(65) Prior Publication Data

US 2019/0149462 A1    May 16, 2019

(51) Int. Cl.
*H04L 12/723* (2013.01)
*H04L 12/46* (2006.01)
*H04L 12/721* (2013.01)
*H04L 29/12* (2006.01)

(52) U.S. Cl.
CPC .......... *H04L 45/50* (2013.01); *H04L 12/4641* (2013.01); *H04L 12/4645* (2013.01); *H04L 45/66* (2013.01); *H04L 61/6022* (2013.01)

(58) Field of Classification Search
CPC ..... H04L 45/50; H04L 45/66; H04L 12/4641; H04L 61/6022
See application file for complete search history.

(56) References Cited

U.S. PATENT DOCUMENTS

2010/0329265 A1* 12/2010 Lapuh ................. H04L 12/4645
370/395.53
2018/0309596 A1* 10/2018 Brissette ............. H04L 12/4679

OTHER PUBLICATIONS

A. Sajassi et al.; "BGP MPLS-Based Ethernet VPN"; RFC 7432; DOI 10.17487/RFC7432; <https://www.rfc-editor.org/info/rfc7432>; Feb. 2015 (56 pages).

* cited by examiner

*Primary Examiner* — Thai Nguyen
(74) *Attorney, Agent, or Firm* — Chamberlain, Hrdlicka, White, Williams & Aughtry (57) ABSTRACT

In general, embodiments of the invention relate to a system and method for processing Multiprotocol Label Switching (MPLS) frames. More specifically, embodiments of the invention relate to a method and system for implementing aliasing using Media Access Control (MAC)-Virtual Routing Function (VRF) labels on a per-Ethernet VPN Instance (EVI) basis.

20 Claims, 8 Drawing Sheets

METHOD AND SYSTEM USING A SCALABLE LABEL SCHEME FOR ALIASING IN A MULTIHOMED ETHERNET VIRTUAL PRIVATE NETWORK (EVPN) NETWORK

BACKGROUND

Various mechanisms are used to route and/or forward traffic within a network. Network resources are required to implement these mechanisms. As the size of the network increases, the network resources required to implement the aforementioned mechanisms may limit the scalability of the network beyond a certain size.

SUMMARY

In general, in one aspect, the invention relates to a method for processing frames. The method includes receiving, by a network element, a frame comprising an MAC-VRF label and a first media access control (MAC) address, identifying, using the MAC-VRF label, a virtual local area network (VLAN), identifying, using an identifier associated with the WAN and the first MAC address, an egress port on the network element, and transmitting a second frame, comprising at least a portion of the frame, from the egress port towards a destination associated with the first MAC address, wherein the first MAC address is not locally-learned by the network element.

In general, in one aspect, the invention relates to a non-transitory computer readable medium (CRM) comprising computer readable program code, which when executed by a processor, enables the processor to: receive, by a network element, a frame comprising an MAC-VRF label and a first media access control (MAC) address, identify, using the MAC-VRF label, a virtual local area network (VLAN), identify, using an identifier associated with the VLAN and the first MAC address, an egress port on the network element, and transmit a second frame, comprising at least a portion of the frame, from the egress port towards a destination associated with the first MAC address, wherein the first MAC address is not locally-learned by the network element.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5D, any component described with regard to a figure, in various embodiments of the invention, may be equivalent to one or more like-named components described with regard to any other figure, For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a system and method for processing Multiprotocol Label Switching (MPLS) frames. More specifically, embodiments of the invention relate to a method and system for implementing aliasing using Media Access Control (MAC)-Virtual Routing Function (VRF) labels on a per-Ethernet VPN Instance (EVI) basis. By implementing aliasing using MAC-VRF labels on a per-EVI basis, various embodiments of the invention enable support for a larger number of EVIs by limiting the network resources required to implement aliasing.

In one embodiment of the invention, the EVI is associated with a single VLAN (i.e., there is a 1:1 mapping between the EVI and the VLAN) (also referred to as a VLAN-based model). In other embodiments of the invention, the EVI is mapped to multiple VLANs (i.e., there is a 1:n mapping between the EVI and the VLANs) (also referred to as VLAN bundle model). While the various portions of the following description are described with respect to a VLAN-based model, the invention is not limited to the VLAN-based model. Rather, embodiments of the invention may also be implemented using the VLAN-bundle model without departing from the invention.

Figure 1:
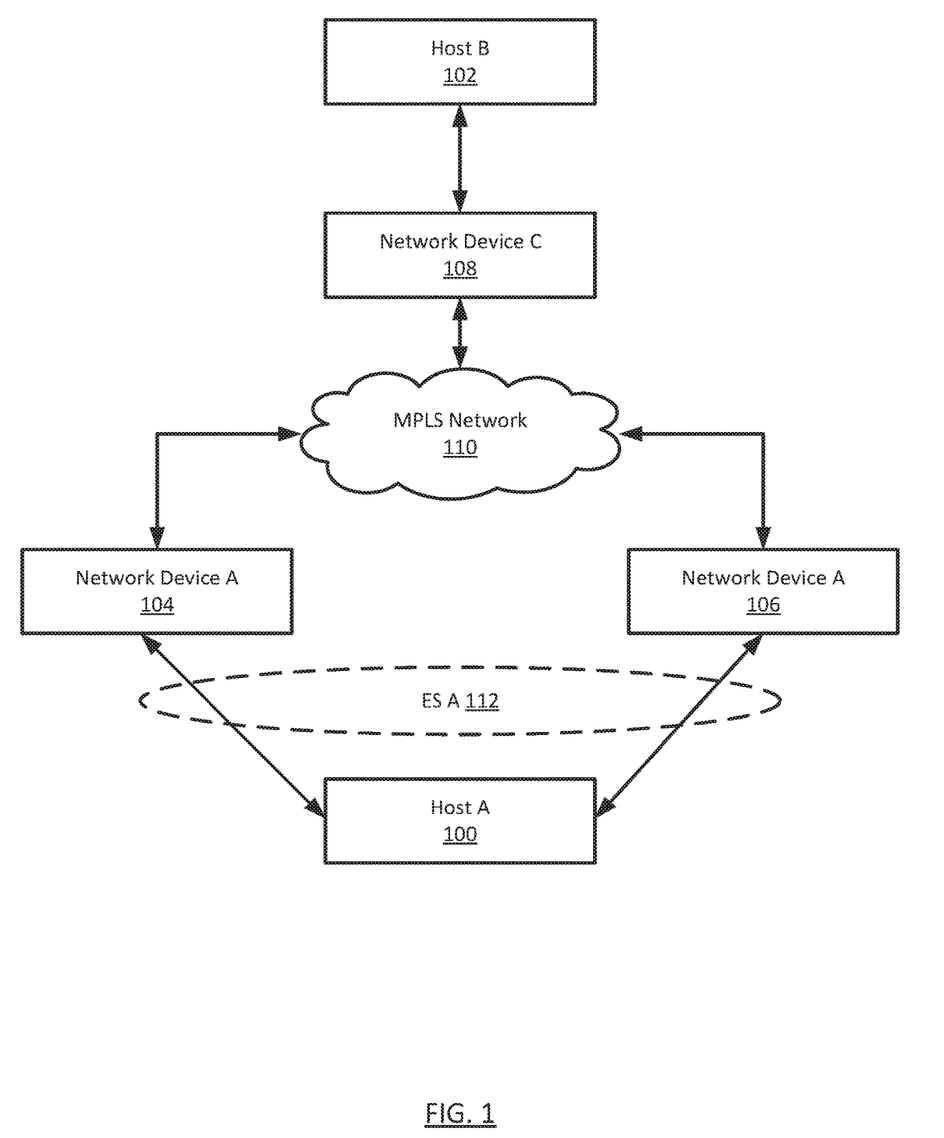
FIG. 1 shows a system in accordance with one or more embodiments of the invention.

FIG. 1 shows a system in accordance with one or more embodiments of the invention. The system includes one or more network elements (104, 106, 108) operatively connected through a MPLS network (114). The system further includes hosts (100, 102), each of which may be directly connected to one or more network elements (104, 106, 108). Each of these components is described below.

In one embodiment of the invention, a network element (104, 106, 108) may be a physical device that includes persistent storage, memory (e.g., random access memory (RAM), shared memory), one or more processor(s) (e.g., integrated circuits) (including a switch chip or network processor)), and two or more physical network interfaces or ports. The switch chip or network processor may be hardware that determines out of which egress port on the network element (104, 106, 108) to forward media access control (MAC) frames. The switch chip or network processor may include egress and ingress ports that may connect to the physical network interfaces or ports on the network element (104, 106, 108). Further, each physical network interface or port may or may not be connected to another component (e.g., a host (100, 102) or to another network element (104, 106, 108) in the MPLS network (110). A network element (104, 106, 108) may be configured to receive network packets via the network interfaces or ports, and determine whether to: (i) drop the network packet; (ii) process the network packet in accordance with one or more embodiments of the invention; and/or (iii) send the network packet, based on the processing, out another network interface or port on the network element (104, 106, 108) in accordance with one or more embodiments of the invention.

In one embodiment of the invention, the persistent storage on a network element (104, 106, 108) may include any type of non-transitory computer readable medium that includes instructions, which, when executed by the one or more processor(s), enable the network element (104, 106, 108) to perform any of the functionalities described below in FIGS. 2-5D and may also include functionality to implement the MPLS and Border Gateway Protocol (BGP). The functionality of the network elements is not limited to the aforementioned examples. Examples of a network element (104, 106, 108) include, but are not limited to, a switch, a router, and a multilayer switch. A network element (104, 106, 108) is not limited to the aforementioned specific examples.

In one embodiment of the invention, a host (100,102) may be any type of system (e.g., software and computer hardware) that is configured to generate, send, receive, and/or process requests and replies either locally or over a network using software and computer hardware. A host (100,102) may include one or more processor(s), memory, and one or more physical network interface(s). Further, a host (100, 102) may include functionality to generate, receive, and/or transmit MAC frames. Examples of a host (100,102) include, but are not limited to, a server (e.g., a database server, a dynamic host configuration protocol (DHCP) server, an application server, a file server, a print server, a mail server, or any other server), a desktop computer, a mobile device (e.g., a laptop computer, a smart phone, a personal digital assistant, a tablet computer, or any other mobile device), or any other type of computing device with the aforementioned minimum requirements.

In one embodiment of the invention, the MPLS Network (110) may be a set of interconnected network elements or systems (not shown), which operatively the one or more network element(s) (104, 106, 108) of the system. The MPLS Network (110) includes functionality to facilitate communications between these aforementioned components using the MPLS protocol. The MPLS Network (110) may include any combination of local area network (LAN) and/or wide area network (WAN) segments, such as the Internet, which may employ any combination of wired and/or wireless connections and communication protocols.

In one embodiment of the invention, Host A is multihomed to network element A (104) and network element B (106). Accordingly, Host A may communicate with network element A and network element B via the active links that are part of Ethernet Segment A (ES A, 112). From the perspective of Host A, the links to network elements A and B, which are part of ES A, appear as a link aggregation group (LAG).

When network element A and network element B are configured to support multihoming for Host A, they are associated with an Ethernet VPN Instance (EVI). Further, each network element generates is own MAC-VRF label for the EVI. Each of the aforementioned labels is associated with the EVI on their respective network elements. This association may be implemented as a mapping between the MAC-VRF label and the EVI (e.g., a MAC-VRF label to VLAN mapping, see e.g., FIGS. 5A-5D).

Once the aforementioned configuration has been performed, network element A and network element B may advertise Type 1 routes (both per EVI routes and per ES routes) to other network elements in the MPLS network. In this manner, the various MAC-VRF labels associated with the EVI and/or the ES maybe propagated to other network elements in the MPLS network (see e.g., FIGS. 5A-5D below).

While FIG. 1 shows a configuration of components, other system configurations may be used without departing from the scope of the invention.

Figure 2:
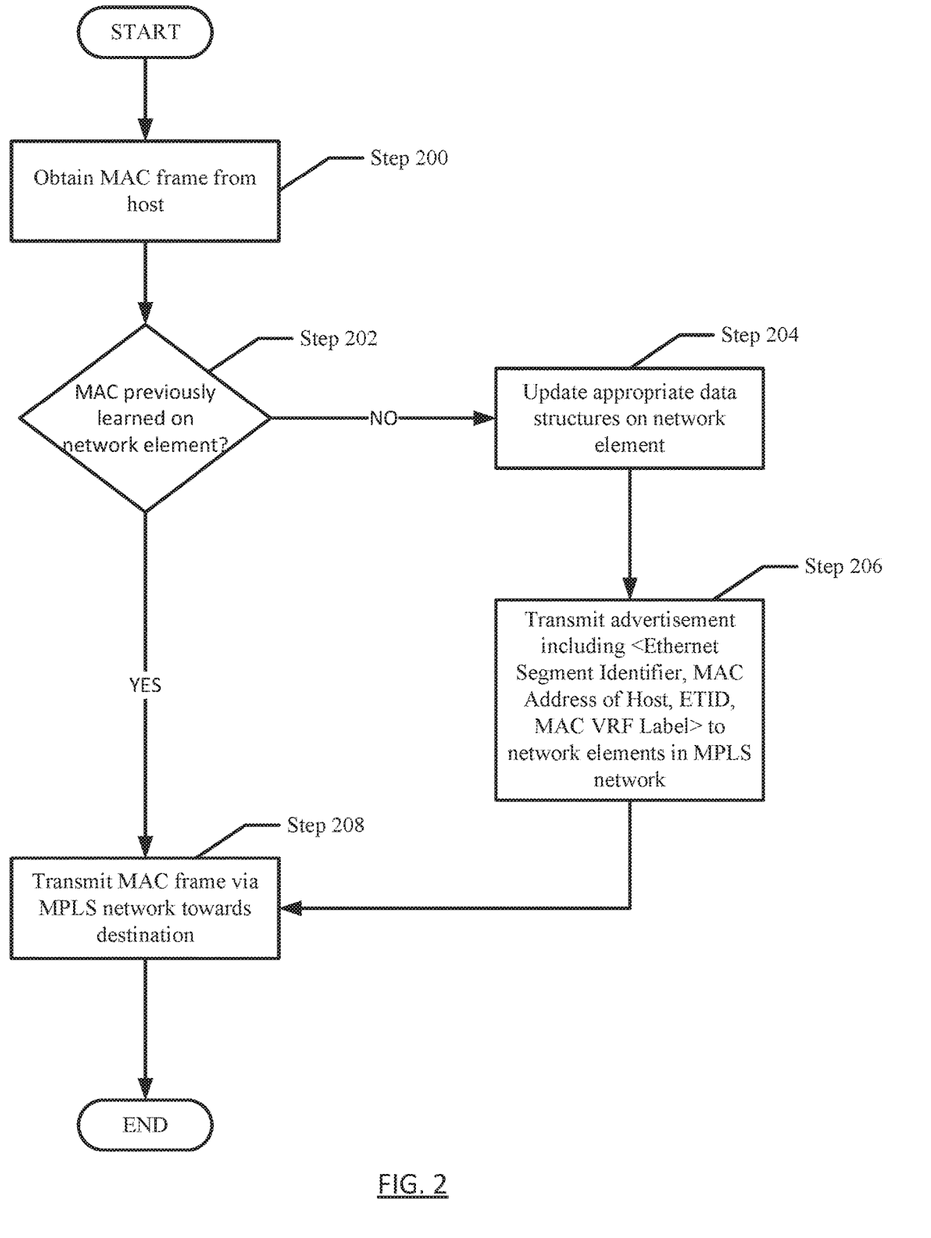
FIG. 2 shows a method for locally-learning a media access control (MAC) address for a network element in accordance with one or more embodiments of the invention.
Figure 3:
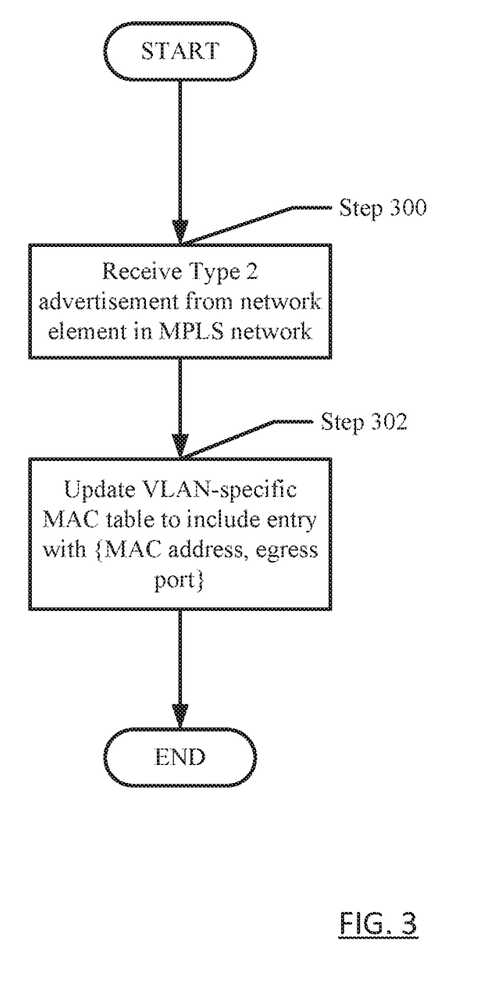
FIG. 3 shows a method for processing an advertisement received from a network element in accordance with one or more embodiments of the invention.
Figure 4:
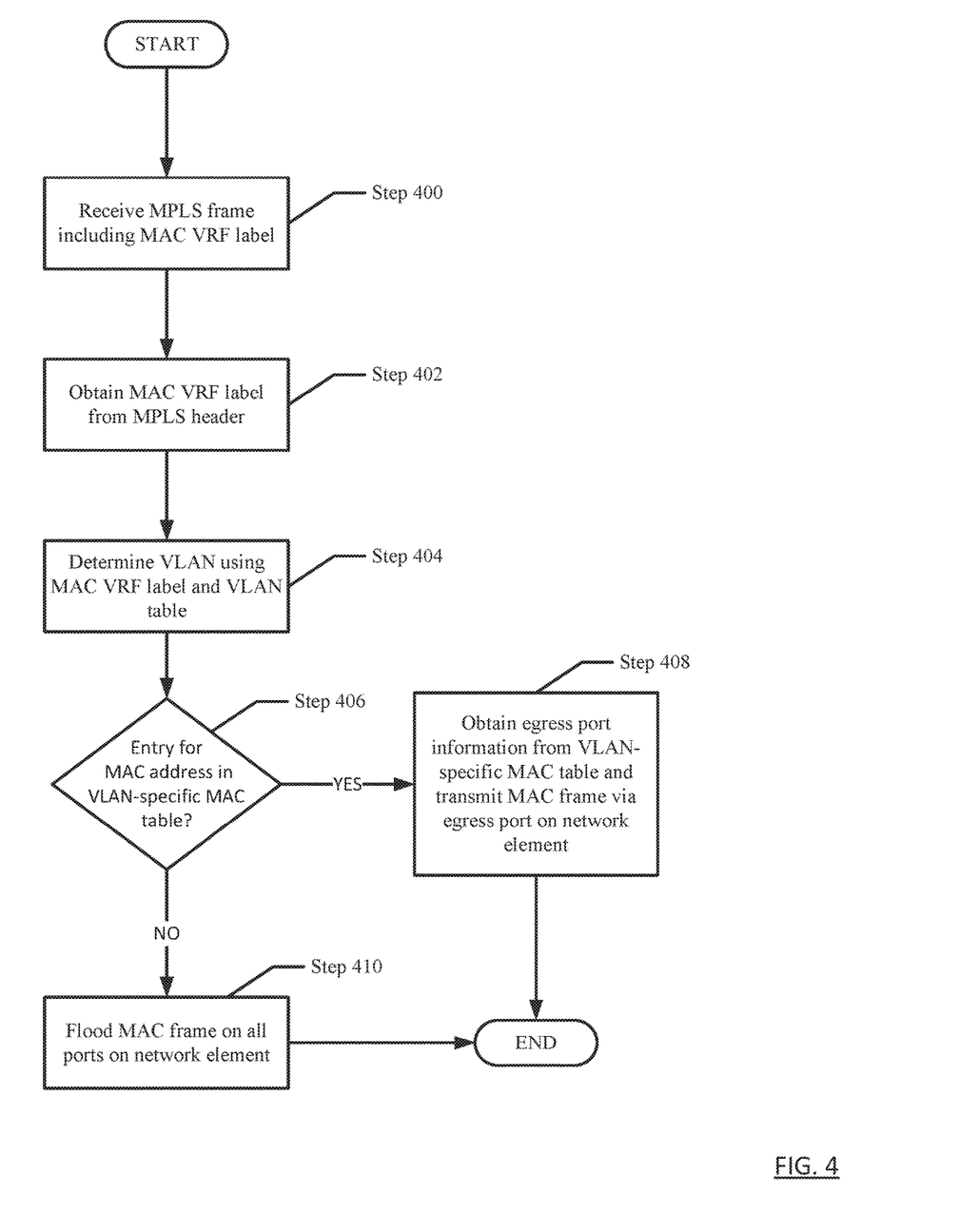
FIG. 4 shows a flowchart for processing Multiprotocol Label Switching (MPLS) frames by a network element in accordance with one or more embodiments of the invention.

FIGS. 2-4 show flowcharts in accordance with one or more embodiments of the invention. While the various steps in the flowcharts are presented and described sequentially, one of ordinary skill in the relevant art will appreciate that sonic or all of the steps may be executed in different orders, may be combined or omitted, and some or all steps may be executed in parallel. In one embodiment of the invention, the steps shown in FIGS. 2-4 may be performed in parallel with any other steps shown in FIGS. 2-4 without departing from the scope of the invention.

Turning to FIG. 2, FIG. 2 shows a method for locally-learning a media access control (MAC) address for a network element in accordance with one or more embodiments of the invention.

In step 200, a MAC frame is received by the network element from a host. In one embodiment of the invention, the MAC frame includes a destination MAC address for another host that is accessible via the network element. The MAC frame may include a source address MAC address (i.e., the MAC address of the host). In one embodiment MAC frame is transmitted to the network element over a VLAN. In such cases, the MAC frame may include a VLAN identifier (e.g., an identifier generated in accordance with IEEE 802.1Q).

The network element that received the MAC frame may be a member in an MPLS network (see e.g., FIG. 1). In such cases, the network element may be referred to a provider edge (PE) in the MPLS network, where the network element provides an interface between hosts connected to the network element and the MPLS network.

Continuing with the discussion of FIG. 2, in step 202, a determination is made about whether the source MAC address included in the MAC frame was previously locally-learned by the network element. If the MAC address was previously learned by the network element, then the process proceeds to step 208 (assuming that the destination MAC address is associated with another host that is only accessible via another network element in the MPLS work); otherwise, the process proceeds to step 204.

In step 204, one or more data structures in the network element are updated to reflect that the network element is directly connected to a host with the MAC address included in the MAC frame received in step 200. More specifically, a MAC forwarding table may be updated to include a new entry, where the new entry includes the aforementioned MAC address and specifies an egress port on the network element. The egress port in the new entry corresponds to an egress port via which MAC frames destined for the host are transmitted. Other data structures may be updated in the network element without departing from the invention.

In step 206, the network element generates and sends an advertisement to other network elements in the MPLS network using, for example, the Border Gateway Protocol. More specifically, the network element may advertise a Type 2 route (also referred to as an EVPN MAC/IP route (Type-2). The advertisement may include one or more of the following pieces of information: Ethernet Segment Identifier (ESI), MAC address (i.e., the source MAC address from the MAC frame received in step 200), Ethernet Tag ID (ETID) (which may be derived from a VLAN ID), and a MAC-VRF label. The Ethernet Tag ID includes information that identifies a particular broadcast domain (e.g., a VLAN(s)) in the EVI. Other information may be included in the advertisement without departing from the invention.

In step 208, the MAC frame is transmitted by the network element, via the MPLS network, towards its destination (assuming that the destination MAC address is associated with another host that is only accessible via another network element in the MPLS work). More specifically, the MAC frame may be encapsulated in accordance with MPLS protocol and transmitted, via the MPLS network, towards another PE, where the PE is directly or indirectly connected to a destination host. The destination host may be a host that is associated with the destination MAC address in the MAC frame (i.e., the MAC frame that was received in step 200).

Turning to FIG. 3, FIG. 3 shows a method for processing an advertisement received from a network element in accordance with one or more embodiments of the invention.

In step 300, an advertisement (e.g., the advertisement sent in Step 206) is received by a network element from another network device in the MPLS network. In one embodiment of the invention, the network element that received the advertisement and the network element that sent the advertisement are on the same Ethernet Segment (ES).

In step 302, once a determination is made that the MAC address in the advertisement was learned by another network element on the same Ethernet Segment (ES) as the network element (i.e., the network element performing FIG. 3) and the MAC address has not been locally-learned by the network element (i.e., the network element performing FIG. 3), then a VLAN-specific MAC table is updated to include a new entry. The new entry includes the MAC address from the advertisement and specifies an egress port on the network element, where the egress port is used to transmit MAC frames towards the host associated with the aforementioned MAC address. The MAC address stored in the aforementioned entry is stored as a locally-learned MAC address even though it was learned via the advertisement from another network element on the same ES. Those skilled in the art will appreciated that the VLAN-specific MAC table may include a series of entries, where each entry includes a MAC address and specifies an egress port.

In one embodiment of the invention, if the EVI is associated with multiple VLANs (i.e., in the VLAN-bundle model), the VLAN-specific MAC table includes entries for all VLANs in the bundle. Such a table may be referred to as a VLANs-specific MAC table.

Turning to FIG. 4, FIG. 4 shows a flowchart for processing Multiprotocol Label Switching (MPLS) frames by a network element in accordance with one or more embodiments of the invention. The method shown in FIG. 4 may be performed by the same network element that performed the method shown in FIG. 3. Other network elements may perform this processing without departing from the invention.

In step 400, a network device receives an MPLS frame that includes a MAC-VRF label. The MPLS frame also includes, as its payload, a MAC frame. The MAC frame includes a destination MAC address.

In step 402, the MACAW label is obtained from the MPLS header in the MPLS frame.

In step 404, the MAC-VRF label is used to identify a VLAN. In one embodiment of the invention, the network device includes a VLAN to MAC-VRF label mapping. See e.g., FIG. 5A.

In step 406, a determination is made about whether there is an entry in a VLAN-specific MAC table that includes the MAC address (i.e., the destination MAC address). In one embodiment of the invention, the network element may include multiple VLAN specific MAC tables, where each of the VLAN-specific MAC tables is associated with a separate VLAN. The VLAN-specific MAC table that is used in step 406 corresponds to the VLAN-specific MAC table for the VLAN identified in step 404. If there is an entry with the MAC address in the VLAN-specific MAC table, then the process proceeds to step 408; otherwise, the process proceeds to step 410.

In step 408, the egress port information is obtained from the identified entry in the VLAN-specific MAC table. A MAC frame (e.g., the MAC frame that was previously encapsulated in the MPLS frame) is transmitted to towards the destination host (i.e., the host associated with the destination MAC address) via the egress port on the network element.

In step 410, in the event that the VLAN-specific MAC table does not include an entry with the MAC address, the MAC frame (e.g., the MAC frame that was previously encapsulated in the MPLS frame) is flooded to all locally connected egress ports (i.e., egress connected to hosts or other network elements that are not part of the MPLS network). The flooding that occurs in step 410 is performed by the network element even if the network element is not specified as a designated forwarded (DF) in the MPLS network.

FIGS. 5A-5D shows an example system in accordance with one or more embodiments of the invention. The following example, presented in conjunction with components shown in FIGS. 5A-5D, is for explanatory purposes only and not intended to limit the scope of the invention.

Figure 5A:
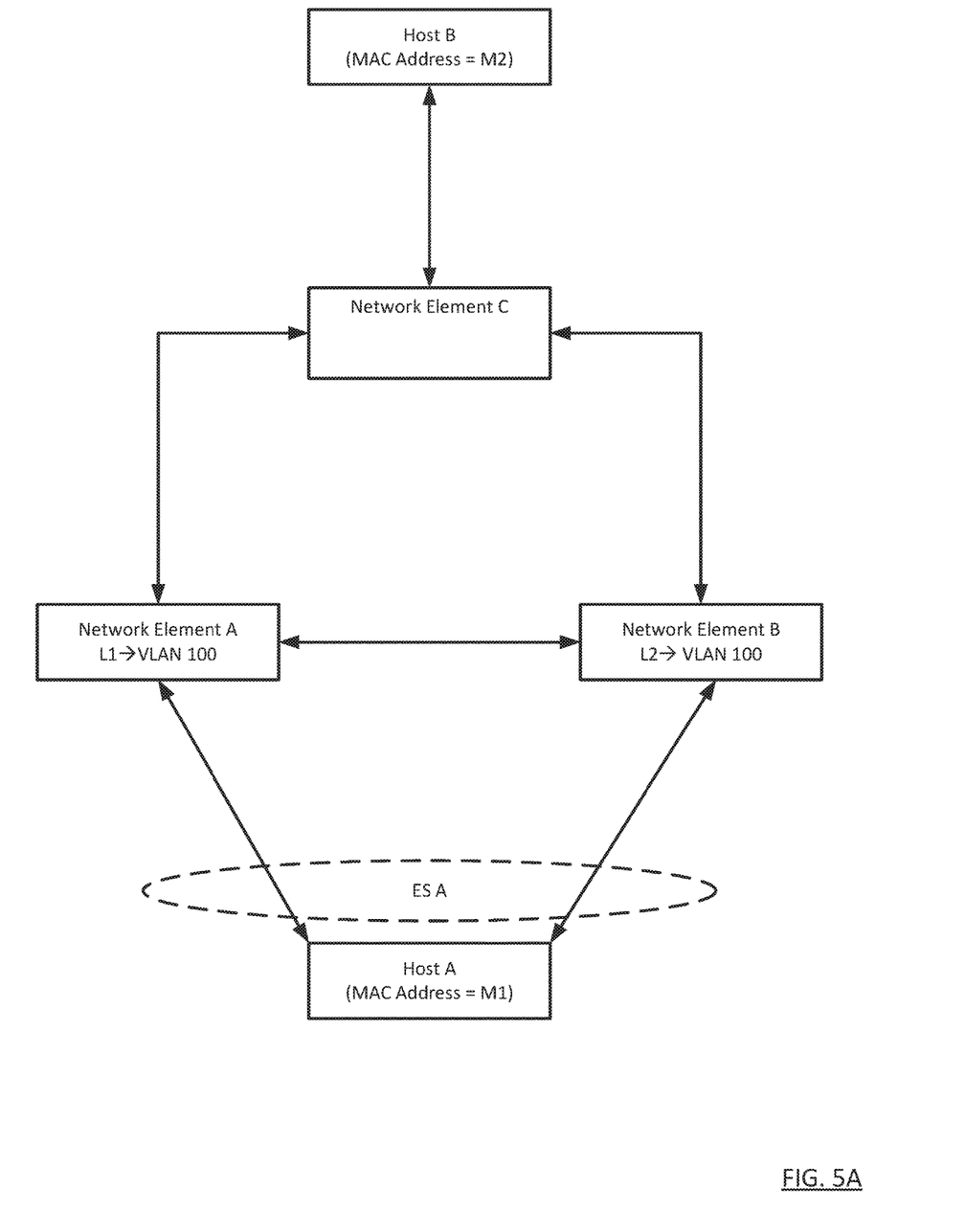
FIGS. 5A-5D shows an example in accordance with one or more embodiments of the invention.

Referring to FIG. 5A, consider a scenario in which Host A is multihomed to network element A and network element B. In this configuration, Host A communicates with network element A and network element B on Ethernet Segment A (ES A). Further, network elements A, B, and C are part of an MPLS network and, as such, communicate using MPLS protocol.

When network element A and network element B are configured to support multihoming for Host A, they are associated with an Ethernet VPN Instance (EVI). In this example, the EVI is associated with a single VLAN, i.e., VLAN 100. Further, each network element generates is own MAC-VRF label for the EV1. The MAC-VRF label for the network element A is L1 and the MAC-VRF label for network element B is L2. Each of the aforementioned labels is associated with the EVI (i.e., VLAN 100) on their respective network elements.

Figure 5B:
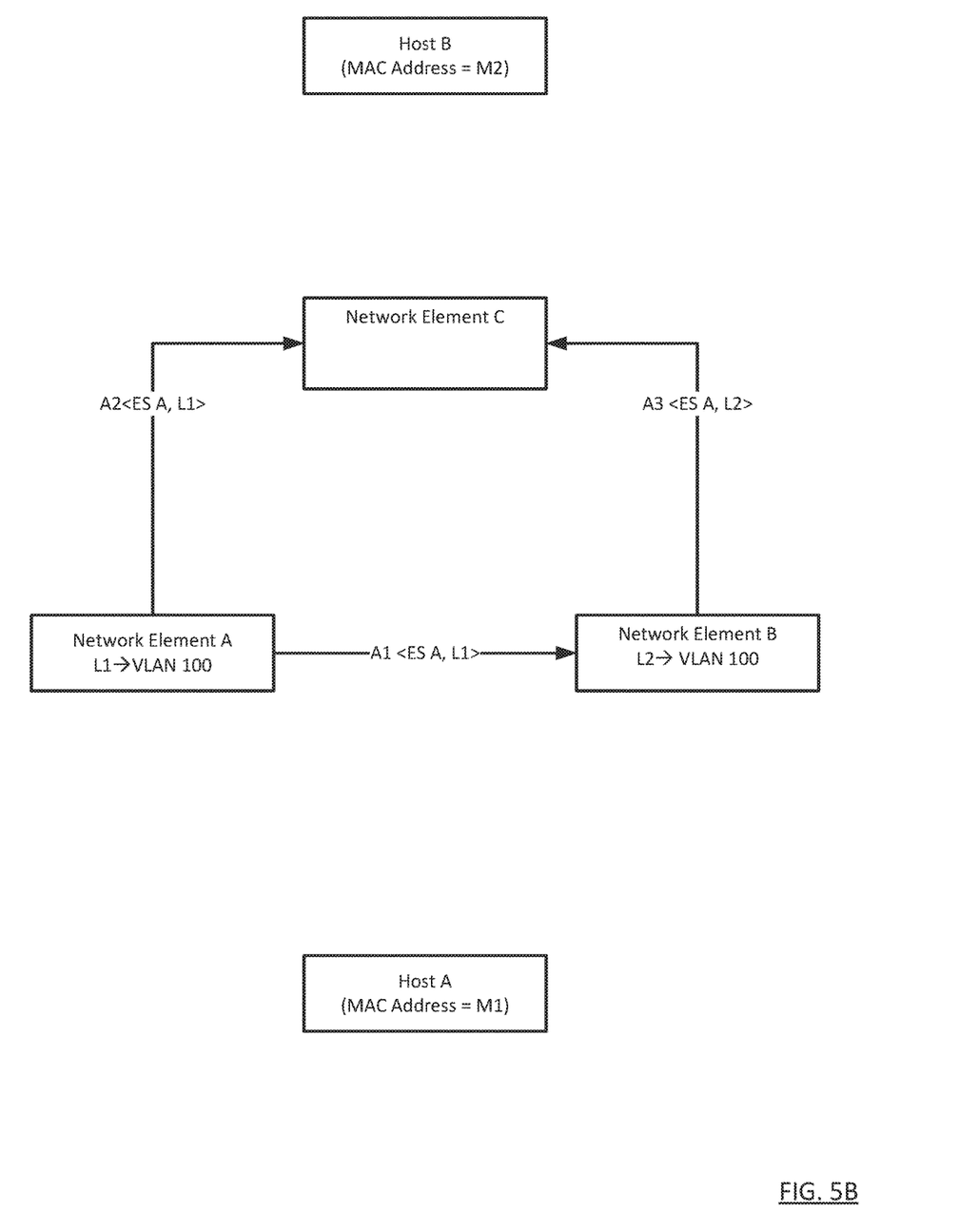

Referring to FIG. 5B, after the network elements have been configured, the network elements advertise Type 1 routes. More specifically, network element A issues a first Type 1 route (A1) with the following content: <ES A, L1> to network element B and a second Type 1 route (A2) with the following content: <ES A, L1> to network element C. A1 and A2 (and all other advertisements listed below) have additional content, which has been omitted from simplicity. In addition, network element B issues a Type 1 route (A3) with the following content: <ES A, L2> to network element C. Other advertisements issued by the network elements are omitted in the example for clarity.

Figure 5C:
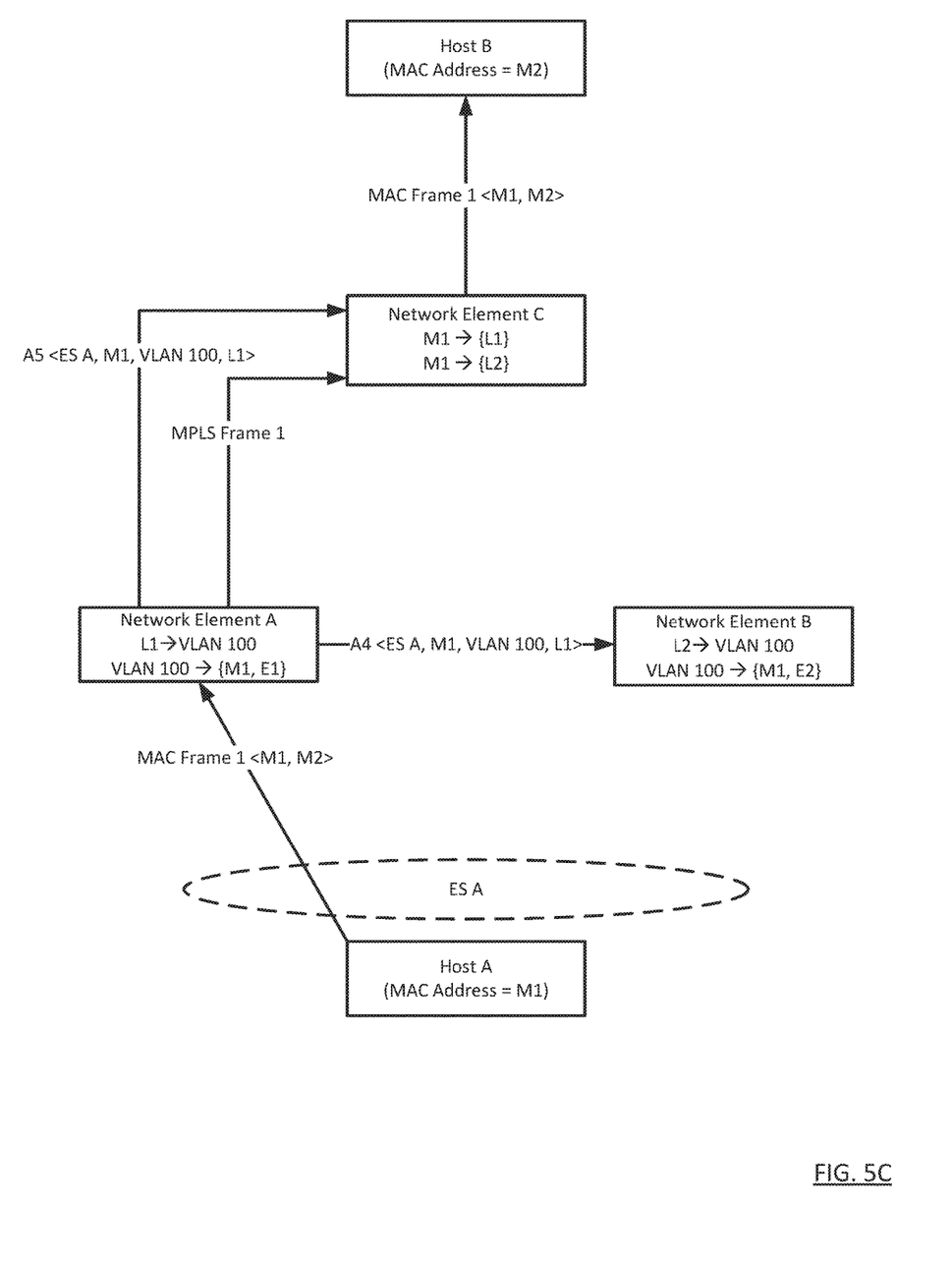

Referring to FIG. 5C, at some point in time after the Type 1 routes (A1-A3) have been advertised, Host A transmits MAC Frame 1 to network element A. MAC Frame 1 includes M1 as the source MAC address and M2 as the destination MAC address. Upon receipt of MAC Frame 1, the following actions are performed on network element A: (i) network element A creates the following entry in its VLAN-specific MAC table for VLAN 100: {M1, E1}, where E1 is the egress port on network element A that is connected to Host A; (ii) network element A sends a Type 2 route (A4) with the following content: <ES A, M1, VLAN 100, L1> to network element B; (iii) network element A sends a Type 2 route (A5) with the following content: <ES A, M1, VLAN 100, L1> to network element C; (iv) network element A encapsulates MAC Frame 1 to generate MPLS Frame 1 and transmits MPLS Frame 1 to network element C, assuming that network element A has been previously learned that a host with MAC address M2 is reachable via network element C. With respect to this example, VLAN 100 specified in the Type 2 route is the Ethernet Tag ID.

Network element B, upon receipt of the Type 2 route (A4), creates the following entry in its VLAN-specific MAC table for VLAN 100: {M1, E2}, where E2 is the egress port on network element B that is connected to Host A. The aforementioned entry is created using information from both the Type 1 route (A1) and the Type 2 route (A4).

Network element C, upon receipt of Type 2 route (A5), creates the following two entries in its MAC forwarding table: (i) M1→L1 and (ii) M1→L2. The first entry (i.e., M1→L1) is created using the Type 1 route (A2) from network element A and the Type 2 route (A5). The second entry (i.e., M1→L2) is generated based on information from the Type 1 route (A2) from network element A, the Type 1 route (A3) from network element B and the Type 2 route (A5) from network element A.

In addition to network element C creating the aforementioned entries, network element C, upon receipt of MPLS Frame 1, extracts and transmits MAC Frame 1 to Host B.

Figure 5D:
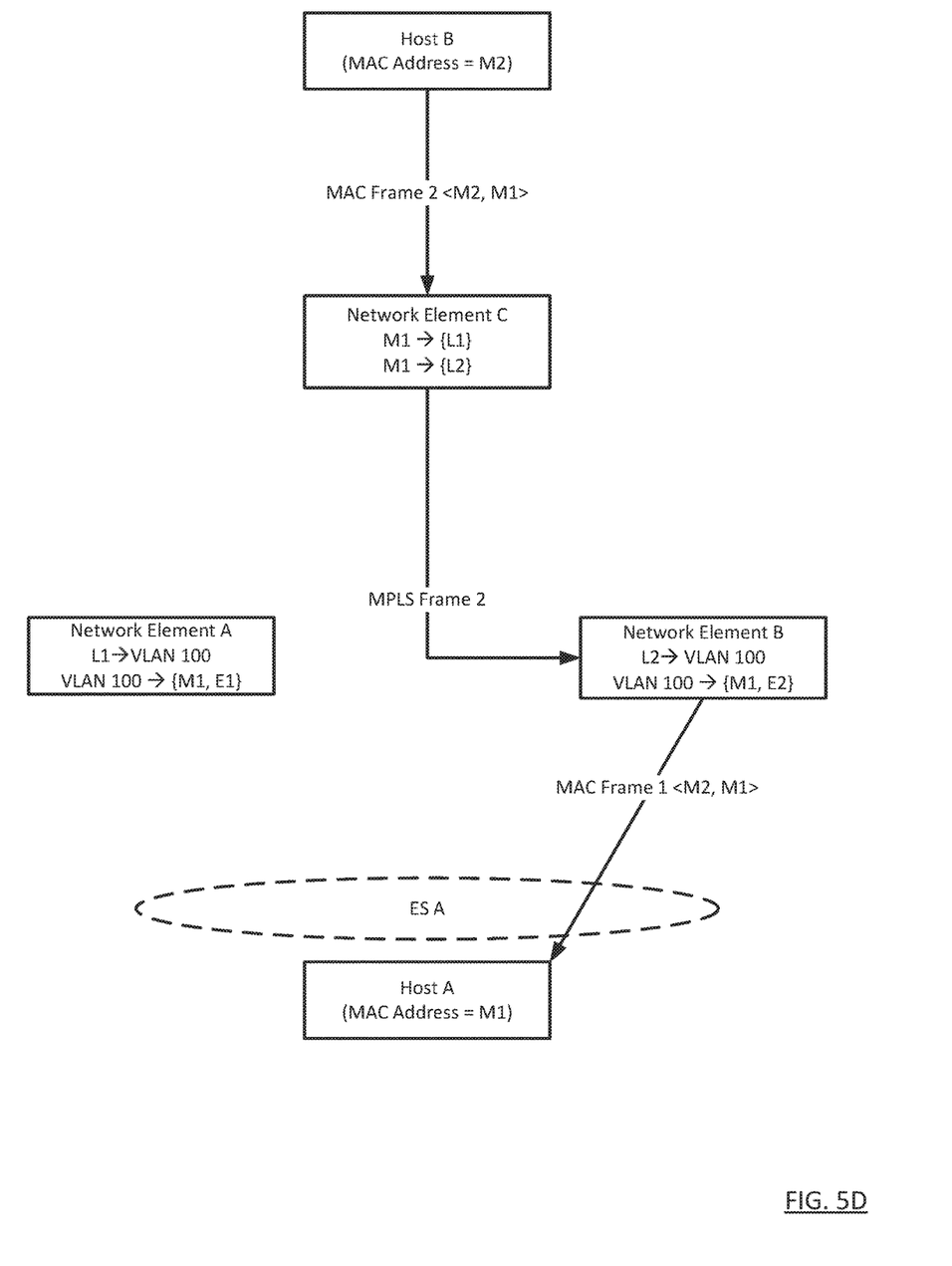

Referring to FIG. 5D, at some later point in time after MAC Frame 1 has been received by Host B, Host B generates and transmits MAC Frame 2 to network element C. MAC Frame 2 includes M2 as the source MAC address and M1 as the destination MAC address. Upon receipt of MAC Frame 2, network element C performs a look-up in its MAC forwarding table and selects the second entry (i.e. M1→L2), Using the label, L2, in the entry, MAC Frame 2 is encapsulated to generate MPLS Frame 2. MPLS Frame 2 is then transmitted to network element B.

Network element B, upon receipt of MPLS Frame 2 extracts MAC Frame 2. In this example, the label L2 is then used to identify the EVI, i.e., VLAN 100. A look-up is then performed on the VLAN-specific MAC table for VLAN 100. The look-up results in the following entry being identified: {M1, E2}. MAC Frame 2 is subsequently transmitted out of egress port E2 to Host A.

Embodiments of the invention provide a mechanism for leveraging the MAC-VRF labels allocated on a per VLAN basis for aliasing instead of using labels on a <port, VLAN> basis In this manner, all remotely learned MAC addresses on an Ethernet Segment associated with a given VLAN are associated with the same MAC-VRF label. This results in a reduced number of labels to be allocated for aliasing, because embodiments of the invention reuse the MAC-VRF labels allocated for EVIs for aliasing, instead of creating separate labels for aliasing.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing frames, comprising:
   receiving, by a network element, a frame comprising a Media Access Control-Virtual Routing Function (MAC-VRF) label and a first media access control (MAC) address;
   identifying, using the MAC-VRF label, a virtual local area network (VLAN);
   identifying, using an identifier associated with the VLAN and the first MAC address, an egress port on the network element; and
   transmitting, by the network element, a second frame, comprising at least a portion of the frame, from the egress port towards a destination associated with the first MAC address, wherein the first MAC address is learned from an advertisement and not locally-learned by the network element,
   wherein the advertisement is received from a second network element,
   wherein the advertisement comprises the MAC address and an Ethernet Segment Identifier (ESI) for an Ethernet Segment (ES), and
   wherein the network element is associated with the ES.

2. The method of claim 1, further comprising:
   receiving, by the network element, a third frame comprising the MAC-VRF label and a second MAC address;
   identifying, by the network element and using the MAC-VRF label, the VLAN;
   identifying, by the network element and using the identifier associated with the VLAN and the second MAC address, a second egress port on the network element; and
   transmitting, by the network element, a forth frame, comprising at least a portion of the second frame, from the second egress port towards a destination associated with the second MAC address.

3. The method of claim 1, further comprising:
   receiving, by the network element, a third frame comprising the MAC-VRF label and a second MAC address;
   identifying, by the network element and using the MAC-VRF label, the VLAN;
   determining, by the network element and using the identifier associated with the VLAN, that the second MAC address is not present in a VLAN-specific MAC table associated with the VLAN; and
   in response to the determination, transmitting by the network element, a plurality of frames out of a plurality of egress ports on the network element, wherein each of the plurality of frames comprising at least a portion of the second frame, wherein at least one of the plurality of egress ports is not a designated forwarder.

4. The method of claim 1, wherein the frame is a Multi-protocol Switching Label (MPLS) frame and the MAC-VRF label is in a header MPLS frame of the frame.

5. The method of claim 4, wherein at least the portion of the frame is a payload in the MPLS frame and comprises the first MAC address.

6. The method of claim 1, further comprising:
creating, by the network element, an entry in a VLAN-specific MAC table for the VLAN, wherein the entry comprises the first MAC address, wherein the egress port is identified using the VLAN-specific MAC table.

7. The method of claim 1, wherein the advertisement further comprises a second MAC-VRF label.

8. The method of claim 7, further comprising:
generating, by the network element, a second advertisement comprising the ESI and the MAC-VRF label; and
publishing, by the network element, the advertisement to network elements in a Multiprotocol Switching Label (MPLS) network, wherein the network element and the second network element are members of the MPLS network.

9. The method of claim 8, wherein the MAC-VRF label and the second MAC-VRF label are associated with an Ethernet VPN Instance (EVI).

10. The method of claim 1, wherein the network element is one selected from a group consisting of a switch, a router, and a multilayer switch.

11. A non-transitory computer readable medium (CRM) comprising computer readable program code, which when executed by a processor on a network element, enables the network element to:
receive, by the network element, a frame comprising a Media Access Control-Virtual Routing Function (MAC-VRF) label and a first media access control (MAC) address;
identify, using the MAC-VRF label, a virtual local area network (VLAN);
identify, using an identifier associated with the VLAN and the first MAC address, an egress port on the network element; and
transmit a second frame, comprising at least a portion of the frame, from the egress port towards a destination associated with the first MAC address, wherein the first MAC address is learned from an advertisement and not locally-learned by the network element,
wherein the advertisement is received from a second network element,
wherein the advertisement comprises the MAC address and an Ethernet Segment Identifier (ESI) for an Ethernet Segment (ES), and
wherein the network element is associated with the ES.

12. The non-transitory CRM of claim 11, further comprising additional computer readable program code, which when executed by the processor, further enables the network element to:
receive, by the network element, a third frame comprising the MAC-VRF label and a second MAC address;
identify, using the MAC-VRF label, the VLAN;
identify, using the identifier associated with the VLAN and the second MAC address, a second egress port on the network element; and
transmit a forth frame, comprising at least a portion of the second frame, from the second egress port towards a destination associated with the second MAC address.

13. The non-transitory CRM of claim 11, further comprising additional computer readable program code, which when executed by the processor, further enables the network element to:
receive, by the network element, a third frame comprising the MAC-VRF label and a second MAC address;
identify, using the MAC-VRF label, the VLAN;
determine, using the identifier associated with the VLAN, that the second MAC address is not present in a VLAN-specific MAC table associated with the VLAN; and
in response to the determination, transmit a plurality of frames out of a plurality of egress ports on the network element, wherein each of the plurality of frames comprising at least a portion of the second frame, wherein at least one of the plurality of egress ports is not a designated forwarder.

14. The non-transitory CRM of claim 11, wherein the frame is a Multiprotocol Switching Label (MPLS) frame and the MAC-VRF label is in a header MPLS frame of the frame.

15. The non-transitory CRM of claim 14, wherein at least the portion of the frame is a payload in the MPLS frame and comprises the first MAC address.

16. The non-transitory CRM of claim 11, further comprising additional computer readable program code, which when executed by the processor, further enables the network element to:
create an entry in a VLAN-specific MAC table for the VLAN, wherein the entry comprises the first MAC address, wherein the egress port is identified using the VLAN-specific MAC table.

17. The non-transitory CRM of claim 11, wherein the advertisement further comprises a second MAC-VRF label.

18. The non-transitory CRM of claim 17, further comprising additional computer readable program code, which when executed by the processor, further enables the network element to:
generate, by the network element, a second advertisement comprising the ESI and the MAC-VRF label; and
publish the advertisement to network elements in a Multiprotocol Switching Label (MPLS) network, wherein the network element and the second network element are members of the MPLS network.

19. The non-transitory CRM of claim 18, wherein the MAC-VRF label and the second MAC-VRF label are associated with an Ethernet VPN Instance (EVI).

20. The non-transitory CRM of claim 11, wherein the network element is one selected from a group consisting of a switch, a router, and a multilayer switch.

* * * * *

UNITED STATES PATENT AND TRADEMARK OFFICE
CERTIFICATE OF CORRECTION

PATENT NO.          : 10,476,786 B2                                              Page 1 of 1
APPLICATION NO.     : 15/810406
DATED               : November 12, 2019
INVENTOR(S)         : Rajesh Kumar Semwal

It is certified that error appears in the above-identified patent and that said Letters Patent is hereby corrected as shown below:

In the Claims

Column 8, Line 51, in Claim 2, the phrase "a forth frame" should read -- a fourth frame --.

Column 10, Line 5, in Claim 12, the phrase "transmit a forth frame" should read -- transmit a fourth frame --.

Signed and Sealed this
Fourteenth Day of January, 2020

Andrei Iancu
*Director of the United States Patent and Trademark Office*